US008645217B2

(12) United States Patent
Siegel et al.

(10) Patent No.: US 8,645,217 B2
(45) Date of Patent: Feb. 4, 2014

(54) METHODS AND APPARATUS FOR USING SELF-CONTAINED TRANSACTION COMPONENTS TO FACILITATE ONLINE TRANSACTIONS

(75) Inventors: Jonathan Siegel, Santa Barbara, CA (US); Kevin Milden, Santa Barbara, CA (US)

(73) Assignee: Shoperion, Inc., Aliso Vjejo, CA (US)

( * ) Notice: Subject to any disclaimer, the term of this patent is extended or adjusted under 35 U.S.C. 154(b) by 1593 days.

(21) Appl. No.: 11/419,111

(22) Filed: May 18, 2006

(65) Prior Publication Data
US 2007/0271149 A1    Nov. 22, 2007

(51) Int. Cl.
*G06Q 30/00* (2012.01)

(52) U.S. Cl.
USPC .......................................... 705/26.1

(58) Field of Classification Search
USPC .................. 705/26, 27, 26.1, 27.1
See application file for complete search history.

(56) References Cited

U.S. PATENT DOCUMENTS

| | | | | |
|---|---|---|---|---|
| 7,162,443 B2* | 1/2007 | Shah | .......................... | 705/26.35 |
| 7,197,475 B1* | 3/2007 | Lorenzen et al. | .......... | 705/26.81 |
| 7,225,148 B2* | 5/2007 | Kassan | ...................... | 705/26.44 |
| 7,512,548 B1* | 3/2009 | Bezos et al. | ................. | 705/26.1 |
| 7,877,295 B2* | 1/2011 | Mengerink et al. | .......... | 705/26.8 |
| 2001/0007099 A1* | 7/2001 | Rau et al. | ........................ | 705/26 |
| 2002/0002513 A1* | 1/2002 | Chiasson | ........................ | 705/27 |
| 2002/0049637 A1* | 4/2002 | Harman et al. | ................. | 705/26 |
| 2002/0052806 A1* | 5/2002 | Hodson et al. | .................. | 705/27 |
| 2002/0087430 A1* | 7/2002 | Davis et al. | ..................... | 705/26 |
| 2002/0099562 A1* | 7/2002 | Bruce et al. | ....................... | 705/1 |
| 2002/0103752 A1* | 8/2002 | Berger et al. | ................... | 705/39 |
| 2002/0111873 A1* | 8/2002 | Ehrlich et al. | .................. | 705/26 |
| 2002/0143660 A1* | 10/2002 | Himmel et al. | ................. | 705/27 |
| 2002/0143663 A1* | 10/2002 | Walsh et al. | .................... | 705/27 |
| 2002/0194087 A1* | 12/2002 | Spiegel et al. | .................. | 705/26 |
| 2003/0105682 A1* | 6/2003 | Dicker et al. | ................... | 705/27 |
| 2006/0122895 A1* | 6/2006 | Abraham et al. | .............. | 705/26 |
| 2007/0271147 A1* | 11/2007 | Crespo et al. | ................... | 705/26 |

OTHER PUBLICATIONS

Gurevych, Vadym. OsCommerce Webmaster's Guide to Selling Online, Packt Publishing, 2007.*

* cited by examiner

*Primary Examiner* — Matthew Zimmerman
(74) *Attorney, Agent, or Firm* — Foley and Lardner LLP; John D. Lanza

(57) ABSTRACT

Systems and methods are described for enabling electronic transactions using self-contained transaction components displayed in a portion of a web page. A method comprises: displaying, in a portion of a web page, a self-contained transaction component; receiving, via the self-contained transaction component, input from a user; transmitting, from the self-contained transaction component to a server, information corresponding to the user and the input; and transmitting, from the self-contained transaction component to the server, an indication to complete a transaction corresponding to the user and the previous input. In one embodiment, the self-contained transaction component comprises an e-cart. Corresponding systems are also described.

20 Claims, 10 Drawing Sheets

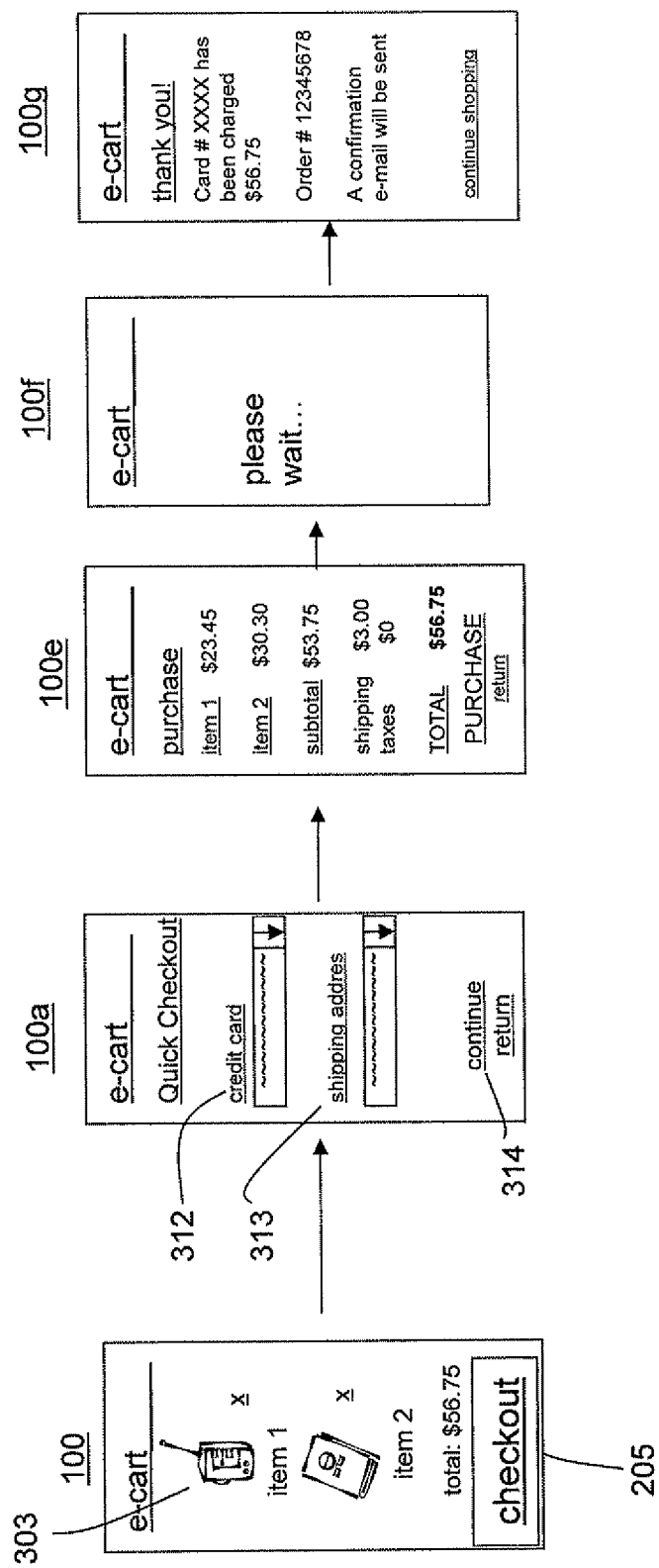

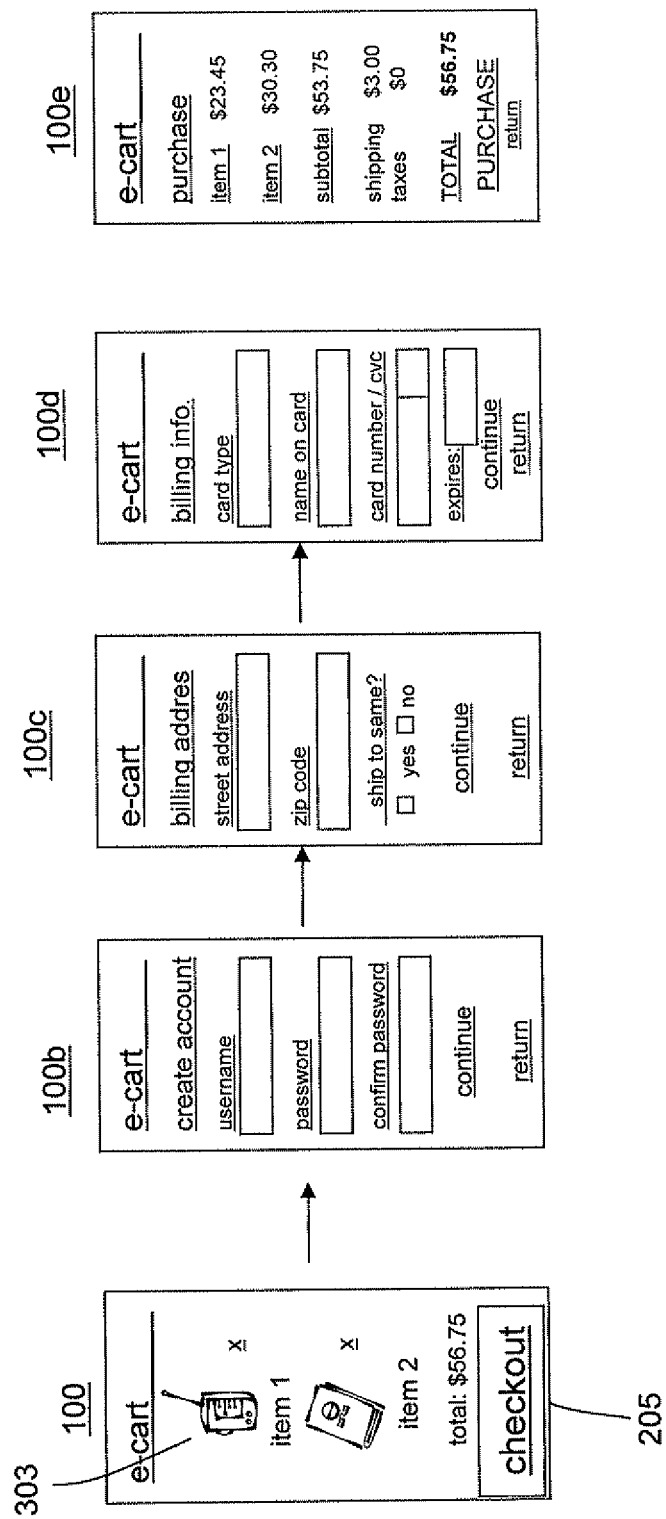

METHODS AND APPARATUS FOR USING SELF-CONTAINED TRANSACTION COMPONENTS TO FACILITATE ONLINE TRANSACTIONS

FIELD OF THE INVENTION

The present invention relates to electronic commerce, and more specifically, to systems and methods for enabling electronic transactions using self-contained transaction components displayed in a portion of a web page.

BACKGROUND OF THE INVENTION

Many current e-commerce websites include means for web site users to complete transactions, such as purchases. One such means is a cart which allows a user to maintain a list of items the user is interested in purchasing while the user continues to browse the site. Carts like this can be referred to as "e-carts." Many e-carts allow a user to maintain a list of items even after the user leaves the web site. Upon a user returning to a web site, the e-cart will display the items previously added.

Current e-carts may suffer from a number of drawbacks. First, e-carts may require a user to leave the page they are currently viewing to complete a transaction. For example, an e-cart may contain a "purchase" button, and upon a user pressing the button, the user will be taken to a new page to fill out information relating to the purchase, such as billing and shipping information. This limits the ability of a user to continue to browse or view web pages while completing transactions.

A second limitation is that e-carts are typically not portable among different web sites. This results from the fact that many e-commerce web sites implement their own proprietary e-carts. Thus after a user adds an item to their cart, they will not see that item if they begin using an e-cart provided by a different e-commerce site. Further, the different e-cart systems provided by many e-commerce sites may each require individual logins, each have a unique purchasing method, and require a user to enter billing information every time the user purchases something from a new online store.

A third limitation is that many sites simply do not provide e-carts or transaction functionality due to the expense and complexity of implementation. If one of these sites desires to give users the option to purchase products mentioned on the site, the site may provide an external link. The drawback of this approach is it may require users to leave the site to purchase an item.

Thus there exists a need for an e-cart which allows a user to collect and browse items from a plurality of different websites, and which can easily be incorporated into web sites.

SUMMARY OF THE INVENTION

The present invention is directed to systems and methods for enabling electronic transactions using self-contained transaction components displayed in a portion of a web page. The systems and methods include an e-cart which allows a user to collect items from many unaffiliated web sites into a single e-cart for simultaneous purchase. The systems and methods also include an e-cart system which allows a web site operator to include an e-cart on a web site which allows site visitors to purchase items discussed on the web site without requiring users to leave the site.

In one aspect the invention relates to a method for facilitating third-party transactions on a web page using a self-contained transaction component, the method comprising: displaying, in a portion of a web page, a self-contained transaction component; receiving, via the self-contained transaction component, input from a user; transmitting, from the self-contained transaction component to a server, information corresponding to the user and the input; and transmitting, from the self-contained transaction component to the server, an indication to complete a transaction corresponding to the user and the previous input. In one embodiment, the self-contained transaction component comprises an e-cart.

In another aspect, the present invention relates to a computer-implemented system for facilitating third-party transactions on a web page using a self-contained transaction component, the system comprising: a self-contained transaction component, wherein the self-contained transaction component occupies a portion of a web page and comprises functionality for a user of the web page to input information and to execute a transaction corresponding to the information input. In one embodiment the system further comprises a server system in communication with the self-contained transaction component, wherein the server system stores information input into the self-contained transaction component.

BRIEF DESCRIPTION OF THE DRAWINGS

The foregoing and other objects, aspects, features, and advantages of the invention will become more apparent and may be better understood by referring to the following description taken in conjunction with the accompanying drawings, in which:

FIG. 3A depicts one example of a self-contained transaction component used to purchase items;

FIG. 3B depicts another example of a self-contained transaction component used to purchase items;

DETAILED DESCRIPTION OF THE INVENTION

Figure 1:
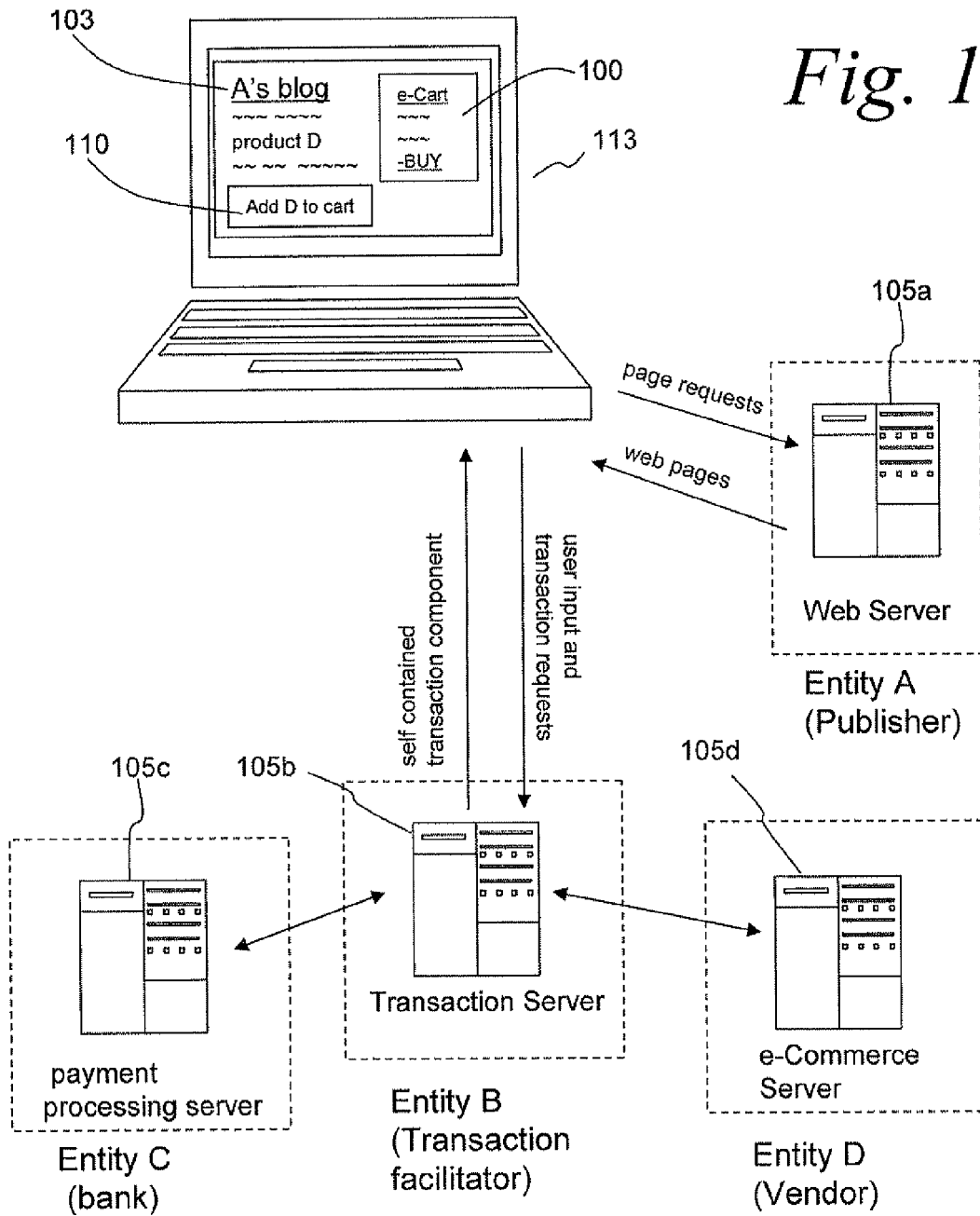
FIG. 1 depicts one embodiment of a computer network useful for facilitating third party transactions.

Referring now to FIG. 1, one embodiment of a computer network useful for facilitating third party transactions is shown. In brief overview, a client 113 is connected to a web server 105*a* to which the client sends requests for web pages and from which the client receives web pages, such as the example web page 103 shown. The client 113 is also connected to a transaction server 105*b* from which the client receives code for displaying a self-contained transaction component 100, such as the example e-cart shown, and to which the client 113 sends to the transaction server 105*b* input and transaction requests. The transaction server 105*b* is connected in turn to a payment processing server 105*c*, and an e-commerce server 105*d* which the transaction server 105*h* may communicate with to execute and fulfill transactions.

Figure 2A:
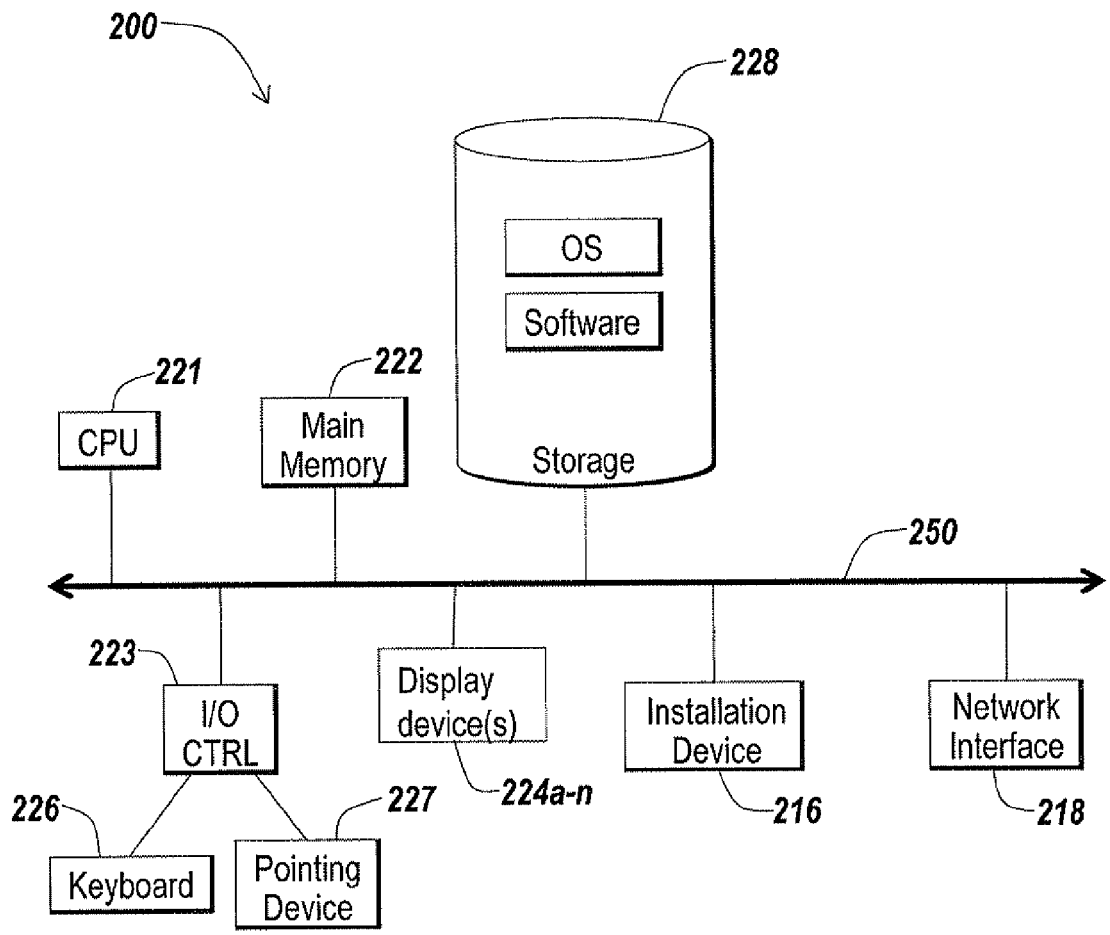
FIGS. 2A and 2B are block diagrams of embodiments of a computing or network device useful as a device in a client-server network.
Figure 2B:
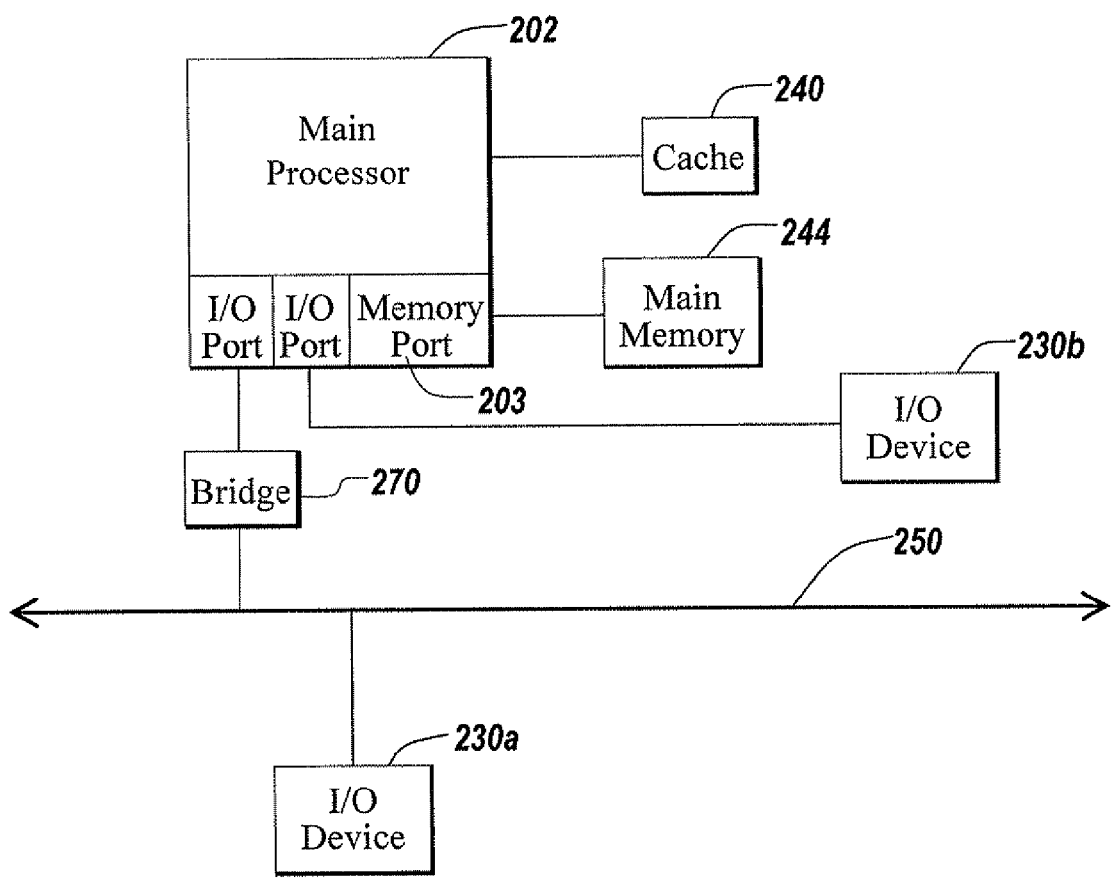

Still referring to FIG. 1, now in greater detail, a client 113 may comprise any computing device, including without limitation computing devices such as the ones described in FIGS. 2A and 2B. The client 113 may comprise functionality for displaying a graphical interface, such as the example web page 103 shown. A server, such as the servers 105a, 105b, 105c, and 105d, may comprise any computing device or devices capable of sending and receiving information. In some embodiments, a server may comprise a group of servers which act as a logical unit, such as, for example, a server farm.

In the embodiment shown, the client 113 is connected to a web server 105a to which the client sends requests for web pages and from which the client receives web pages. The web server 105a may comprise any server or servers capable of delivering content to a client. Examples of content that may be delivered include without limitation news, blogs, product reviews, advertisements, entertainment, and education. In some embodiments, a web page transmitted to a client 113 may be assembled from a plurality of web servers. In some embodiments, a client 113 may be in simultaneous communication with a plurality of web servers.

In the embodiment shown, the client 113 is also connected to a transaction server 105b from which the client receives code for displaying a self-contained transaction component 100, such as the example e-cart shown. Self contained transaction components and e-carts, as well as their interaction with the web pages delivered by a web server 105a will be more fully discussed in relation to FIGS. 3-8. In some embodiments, a transaction server 105b may enable a client 113 to access a single e-cart or other transaction component 100 via a plurality of web sites. In some embodiments, the transaction server 105b may store user data for use along with an e-cart or transaction component. For example, an e-cart may store items from a plurality of web sites, and allow a user to view and purchase the items added to the user's cart at any time, and from any site that includes the e-cart.

In the embodiment shown, the transaction server 105b, may be connected to a payment processing server. A payment processing server may comprise any server capable of processing information corresponding to transferring funds between two parties, such as for example, processing credit card charges, credit card credits, bank account withdrawals and bank account deposits. After receiving an indication from a client 113 via a self-contained transaction component to complete a transaction involving a purchase, a transaction server 105b may communicate with the payment processing server to execute the indicated transaction.

In the embodiment shown, the transaction server 105b is connected to an e-commerce server 105d. An e-commerce server may comprise any server capable of processing information corresponding to commercial transactions, such as ordering products, and processing payments. In one embodiment, after receiving an indication from a client 113 via a self-contained transaction component to complete a transaction involving a purchase, a transaction server 105b may then transmit information corresponding to the transaction to the e-commerce server of a vendor to arrange for the transaction to be fulfilled, such as by shipping a product. In some embodiments, the transaction server may also transfer, to the e-commerce server, funds received from executing the purchase in communication with the payment processing server.

The client 113 and the servers 105a, 105b, 105c, 105d may be connected in any manner, and via any network or networks. Connections and networks included in the connections may comprise the Internet, local networks, web servers, file servers, routers, databases, computers, servers, network appliances, or any other computing devices capable of sending and receiving information. The network may comprise computing devices connected via cables, IR ports, wireless signals, or any other means of connecting multiple computing devices. The network and any devices connected to the networks may communicate via any communication protocol used to communicate among or within computing devices, including without limitation SSL, HTML, XML, RDP, ICA, FTP, HTTP, TCP, IP, UDP, IPX, SPX, NetBIOS, NetBEUI, SMB, SMTP, Ethernet, ARCNET, Fiber Distributed Data Interface (FDDI), RS232, IEEE 802.11, IEEE 802.11a, IEE 802.11b, IEEE 802.11g and direct asynchronous connections, or any combination thereof. The network 111 may comprise mobile telephone networks utilizing any protocol or protocols used to communicate among mobile devices, including AMPS, TDMA, CDMA, GSM, GPRS or UMTS.

In some embodiments the entities operating the servers 105a, 105b, 105c, 105d may be unaffiliated with each other, such as when the entities owning and operating the servers 105a, 105c, and 105d may have no current business affiliations. In some embodiment, each entity may have a contract with the entity operating the transaction server 105b so as to facilitate and apportion proceeds of transactions conducted through the transactions server 105b by a client 113. In some embodiments, an entity operating a transaction server may arrange for a transaction component to be displayed in sites operated by a plurality of unaffiliated publishers.

FIGS. 2A and 2B depict block diagrams of a typical computer 200 useful as client computing devices and server computing devices. As shown in FIGS. 2A and 2B, each computer 200 includes a central processing unit 202, and a main memory unit 204. Each computer 200 may also include other optional elements, such as one or more input/output devices 230a-230-b (generally referred to using reference numeral 230), and a cache memory 240 in communication with the central processing unit 202.

The central processing unit 202 is any logic circuitry that responds to and processes instructions fetched from the main memory unit 204. In many embodiments, the central processing unit is provided by a microprocessor unit, such as those manufactured by Intel Corporation of Mountain View, Calif.; those manufactured by Motorola Corporation of Schaumburg, Ill.; the Crusoe and Efficeon lines of processors manufactured by Transmeta Corporation of Santa Clara, Calif.; the lines of processors manufactured by International Business Machines of White Plains, N.Y.; or the lines of processors manufactured by Advanced Micro Devices of Sunnyvale, Calif.

Main memory unit 204 may be one or more memory chips capable of storing data and allowing any storage location to be directly accessed by the microprocessor 202, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). In the embodiment shown in FIG. 2A, the processor 202 communicates with main memory 204 via a system bus 250 (described in more detail below). FIG. 2B depicts an embodiment of a computer system 200 in which the processor communicates directly with main memory 204 via a memory port. For example, in FIG. 2B the main memory 204 may be DRDRAM.

FIGS. 2A and 2B depict embodiments in which the main processor 202 communicates directly with cache memory 240 via a secondary bus, sometimes referred to as a "backside" bus. In other embodiments, the main processor 202 communicates with cache memory 240 using the system bus 250. Cache memory 240 typically has a faster response time than main memory 204 and is typically provided by SRAM, BSRAM, or EDRAM.

In the embodiment shown in FIG. 2A, the processor 202 communicates with various I/O devices 230 via a local system bus 250. Various busses may be used to connect the central processing unit 202 to the I/O devices 230, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is an video display, the processor 202 may use an Advanced Graphics Port (AGP) to communicate with the display. FIG. 2B depicts an embodiment of a computer system 200 in which the main processor 202 communicates directly with I/O device 230b via HyperTransport, Rapid I/O, or InfiniBand. FIG. 2B also depicts an embodiment in which local busses and direct communication are mixed: the processor 202 communicates with I/O device 230a using a local interconnect bus while communicating with I/O device 230b directly.

A wide variety of I/O devices 230 may be present in the computer system 200. Input devices include keyboards, mice, trackpads, trackballs, cameras, video cameras, microphones, and drawing tablets. Output devices include video displays, speakers, inkjet printers, laser printers, and dye-sublimation printers. An I/O device may also provide mass storage for the computer system 800 such as a hard disk drive, a floppy disk drive for receiving floppy disks such as 3.5-inch, 5.25-inch disks or ZIP disks, a CD-ROM drive, a CD-R/RW drive, a DVD-ROM drive, tape drives of various formats, and USB storage devices such as the USB Flash Drive line of devices manufactured by Twintech Industry, Inc. of Los Alamitos, Calif.

In further embodiments, an I/O device 230 may be a bridge between the system bus 250 and an external communication bus, such as a USB bus, an Apple Desktop Bus, an RS-132 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, or a Serial Attached small computer system interface bus.

General-purpose computers of the sort depicted in FIG. 2A and FIG. 2B typically operate under the control of operating systems, which control scheduling of tasks and access to system resources. Typical operating systems include: MICROSOFT WINDOWS, manufactured by Microsoft Corp. of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, among others.

For embodiments comprising mobile devices, the device may be a JAVA-enabled cellular telephone, such as the i55sr, i58sr, i85s, or the i88s, all of which are manufactured by Motorola Corp. of Schaumburg, Ill.; the 6035 or the 7135, manufactured by Kyocera of Kyoto, Japan; or the i300 or i330, manufactured by Samsung Electronics Co., Ltd., of Seoul, Korea. In other embodiments comprising mobile devices, a mobile device may be a personal digital assistant (PDA) operating under control of the PalmOS operating system, such as the Tungsten W, the VII, the VIIx, the i705, all of which are manufactured by palmOne, Inc. of Milpitas, Calif. In further embodiments, the client 113 may be a personal digital assistant (PDA) operating under control of the PocketPC operating system, such as the iPAQ 4155, iPAQ 5555, iPAQ 1945, iPAQ 2215, and iPAQ 4255, all of which manufactured by Hewlett-Packard Corporation of Palo Alto, Calif.; the ViewSonic V36, manufactured by ViewSonic of Walnut, Calif.; or the Toshiba PocketPC e405, manufactured by Toshiba America, Inc. of New York, N.Y. In still other embodiments, the mobile device is a combination PDA/telephone device such as the Treo 180, Treo 270, Treo 600, Treo 650, Treo 700, or the Treo 700w, all of which are manufactured by palmOne, Inc. of Milpitas, Calif. In still further embodiments, the mobile device is a cellular telephone that operates under control of the PocketPC operating system, such as the MPx200, manufactured by Motorola Corp. A typical mobile device may comprise many of the elements described above in FIGS. 2A and 2B, including the processor 202 and the main memory 204.

Referring now to FIG. 3A, an example of a self-contained transaction component is shown. In brief overview, a self-contained transaction component 100 comprises an e-cart. The e-cart comprises functionality for storing items 303 and conducting transactions with the items. In the embodiment shown, a user may use the e-cart to select from previously entered personal and billing information, and then purchase the items contained in the e-cart. In some embodiments, the self-contained transaction component may be in communication with a server 105b.

Still referring to FIG. 3A, now in greater detail, a self-contained transaction component may comprise a component for display in a portion of a web page for conducting transactions with a user. A self-contained transaction component is a component which allows a user to complete a given transaction entirely from within the component. For example, a user may wish to purchase a given item that the user is reading about in an article on an internet news site. A self-contained transaction component, displayed in a portion of the web page containing the article, would allow the user to successfully purchase the item, including entering necessary billing information, from within the component, and thus does not require the user to leave the web page displaying the article. A self-contained transaction component may interact with any other elements of a web page in which it is displayed.

A self-contained transaction component may be implemented using any technique for displaying content and interacting with a user via a web browser or other graphical interface, including without limitation HTML, DLITML, XML, SVG, Javascript, Java applets, Ajax, Comet, long-lived HTTP connections, Macromedia Flash, browser plugins, and CGI scripting. In some embodiments, a self-contained transaction component may display information and provide functionality specific to a given user, including without limitation displaying information corresponding to past interactions. In some embodiments, a self-contained transaction component may interact with a server 105b to transmit information for storage, or receive information for display.

In the embodiment shown, a self-contained transaction component 100 comprises an e-cart. The e-cart shown comprises functionality for listing stored items 303. An e-cart may comprise any functions common to online shopping carts, including adding and removing items, specifying quantities of items, viewing lists of current and past items in the cart, and sorting items within the cart. An e-cart may also comprise means for indicating that a user would like to execute a transaction. In the embodiment shown, a 'checkout' button 205 is provided for the user to signal a desire to purchase the contents of the e-cart. An e-cart may be used to purchase any products or services. An e-cart may comprise functionality for a user to add, into a single e-cart, items from a plurality of web sites, hosted by a plurality of publishers, and corresponding to a plurality of vendors. The user may then purchase the entire contents of the e-cart in one transaction.

In some embodiments, an e-cart may display information corresponding to items contained in the e-cart. The information displayed may comprise text, pictures, symbols, videos, or sound. In some embodiments, the e-cart may receive information from a server 105*b* to display corresponding to an item. In one embodiment, the e-cart may receive, from a server 105*b*, a particular image of a product to display. In another embodiment, the e-cart may receive and display descriptive text, such as an overview, feature list, articles, or reviews corresponding to a particular product. In still another embodiment the e-cart may receive and display interactive data corresponding to a particular product.

In the embodiment shown, upon a user indicating a desire to purchase the contents of the e-cart, the e-cart may then display information relating to billing, shipping, and purchasing. In one embodiment, an e-cart 100*a* may display previously used billing information 312 corresponding to a particular user, such as credit card numbers that were used in past transactions. In some embodiments, a user may be given a choice between using previously stored billing information, or inputting new billing information. In the embodiment shown, an e-cart 100*a* may display previously used shipping information 313 corresponding to a particular user. In one embodiment previously entered billing information may be stored on a transaction server 105*b*, and then retrieved by the e-cart 100*a*. For example, upon a user clicking the 'checkout' button, an e-cart may send a request to a server 105*b* for previous billing information corresponding to the given user. An e-cart 100*a* may identify that a given user is using the e-cart 100*a* by any technique for identifying a user, including cookies, or requiring a logon process. In some embodiments an e-cart may display a progress meter indicating the user's progress towards completing the transaction. In other embodiments, an e-cart 100*a* may display any other information relating to the transaction, including without limitation purchase price, number of items, and names of items. In yet other embodiments, an e-cart may comprise a button to cancel a transaction and return to the standard shopping cart mode.

In the embodiment shown, after determining account, shipping and billing information, an e-cart 100 may display a purchase confirmation screen 100*e*. A purchase confirmation screen may display any information corresponding to the purchase, including names and prices of items, total prices, shipping information, billing information, account information, tax information, and total price. A purchase confirmation screen 100*e* may also comprise input means, such as a 'purchase' button, for a user to confirm the purchase. A purchase confirmation screen may also comprise means for editing any and all of the information relating to the purchase.

In the embodiment shown, after a user confirms the purchase, an e-cart 100 may display a screen 100*f* while the purchase is being processed. After a user confirms a purchase, the e-cart may transmit any and all of the information corresponding to the purchase to a server 105*b* for execution.

After an e-cart 100 receives an indication from a server 105*b* that a purchase has been completed, the e-cart may display an order confirmation screen 100*g*. An order confirmation screen may display any information relating to the purchase, including an order number, confirmation number, or any information relating to the items purchased. In the embodiment shown, an e-cart may comprise functionality for a user to print information corresponding to the purchase.

Referring now to FIG. 3B, another example of a self-contained transaction component used to purchase items is shown. The e-cart comprises functionality for storing items 303 and conducting transactions with the items. In the embodiment shown, the self-contained transaction component may accept user input corresponding to account, billing, and shipping information.

Still referring to FIG. 3B, now in greater detail, in the embodiment shown, upon a user indicating a desire to purchase the contents of the e-cart, the e-cart may display a series of input screens 100*b*, 100*c*, 100*d* for collecting billing and account information from a user. In some embodiments, an e-cart 100 may display a screen for a user to create a new account in response to a determination that the user does not have an existing account. An e-cart 100 may determine whether a user has an existing account using any technique, including cookies, login screens, and queries to a server 105*b*.

In the embodiment shown, an e-cart may display a screen 100*b* which allows a user to create a new account. The screen 100*b* may collect any information used in a login or account creation process. The screen 100*b* may accept input of any information used by the e-cart for an account, including without limitation a name, e-mail address, password, or any personal information. The e-cart may transmit any and all of said information to a server 105*b* for storage. In some embodiments, after a user creates an account, a cookie or other state information may be stored on the user's computer with information corresponding to the account. In one embodiment, an e-cart may offer a user an option to skip any registration or logon procedures, such as when providing anonymous shopping, or if a user otherwise desires to not have stored information corresponding to their transaction.

In the embodiment shown, after a user inputs information related to creating an account, an e-cart may then display a screen 100*c* which allows input of a billing address. In some embodiments, the billing input screens may be optimized to allow minimal user input. For example, a user may be prompted only for a street address and zip code, after which the e-cart may automatically determine the city and state of the address, In some embodiments, the automatic determination of the city and state of the address may be performed on a server. In the embodiment shown, the screen 100*c* comprises a checkbox for a user to specify whether to ship the items to the same address as the billing information. In some embodiments, if this box is unchecked, the e-cart may display a subsequent screen allowing a user to input a shipping address.

In the embodiment shown, after accepting input of address information, an e-cart 100 may display a screen 100*d* which allows input of billing information. Billing information may comprise any information used to charge the user for the purchase conducted. Billing information may include without limitation credit card information, bank account information, debit card information, coupon information, promotional codes, and information relating to an online funds transfer account, such as a Paypal account.

After receiving the input from a user corresponding to purchase information, the e-cart may then complete the transaction according to any of the embodiments discussed herein.

Figure 4:
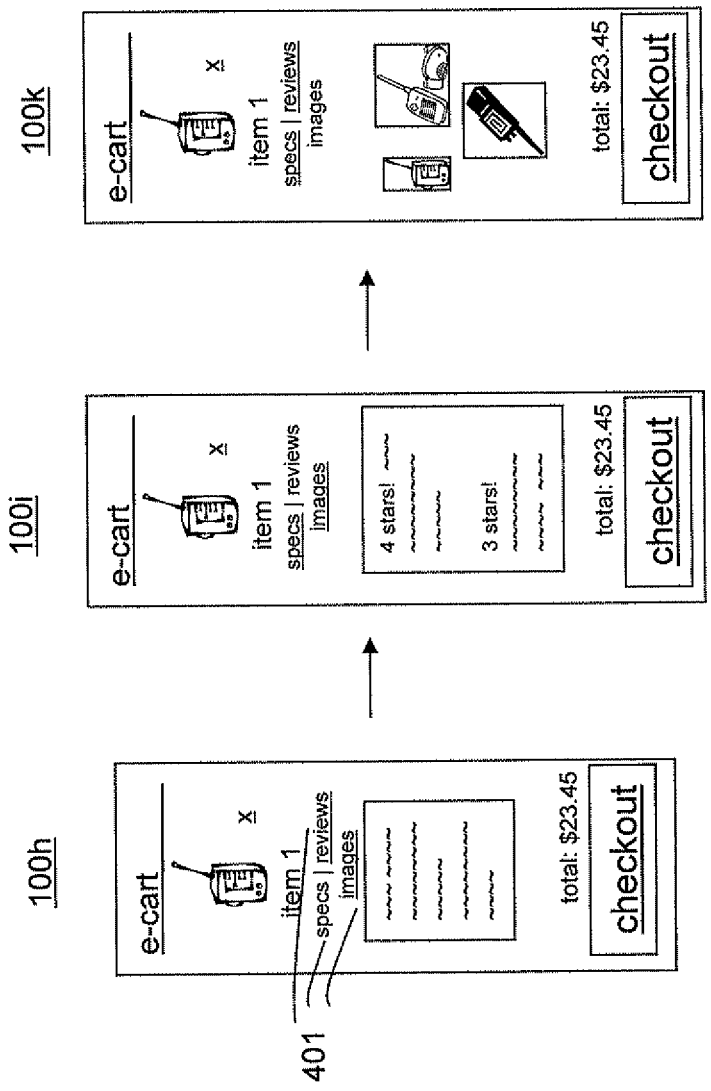
FIG. 4 depicts an e-cart which displays detailed information about an item.

Referring now to FIG. 4, an e-cart which displays detailed information about an item is shown. In brief overview, an e-cart 100*h* comprises an item. The e-cart further comprises means 401 for displaying specifications, reviews, and images of the item. In the embodiment shown, a user may view specifications, reviews, and images of an item by using a number of links displayed with the item. The e-cart 100*h* may also comprise any other e-cart functionality described herein.

Still referring to FIG. 4, now in greater detail, an e-cart 100*h* which displays detailed information relating to an item in the cart is shown. In the embodiment shown, a user may click on links 401 within the e-cart to display information corresponding to the item. In the embodiment shown, an e-cart may display specification information (100*h*), reviews (100*i*), and photos (100*j*). In other embodiments, any detailed information may be displayed relating to an item, including without limitation price comparisons, articles, editorials, user comments, vendor comments, and multimedia information. In some embodiments an e-cart may receive the detailed information from a server 105*b*. In other embodiments, an e-cart may receive the detailed information from any other server, such as a vendor server or other web server. In some embodiments, an e-cart may aggregate information for display from a plurality of servers.

An e-cart may comprise any input elements for allowing a user to access e-cart functionality, including without limitation links, buttons, tabs, text fields, radio buttons, checkboxes, and menus.

Figure 5:
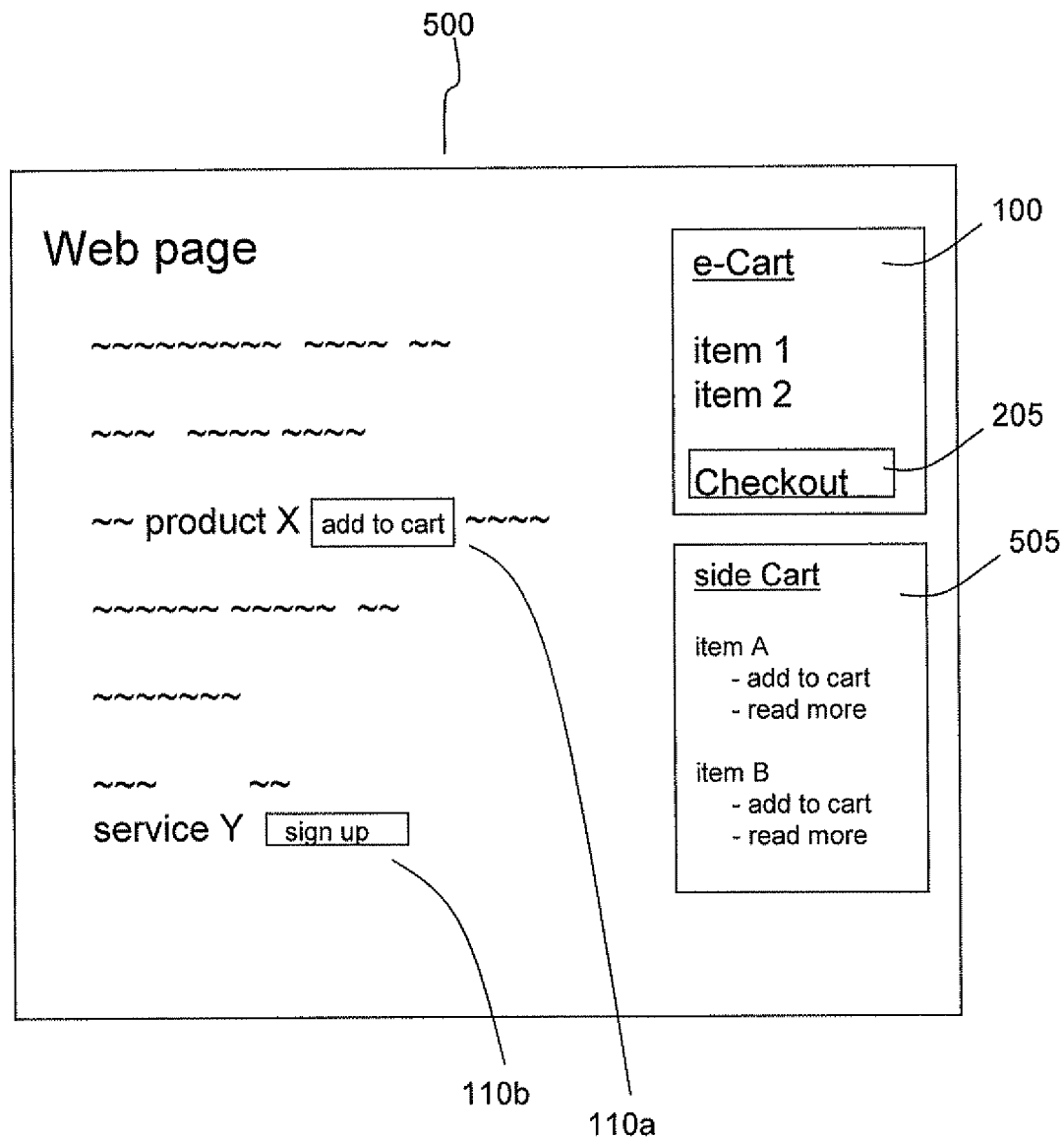
FIG. 5 is a block diagram illustrating an e-cart displayed in a portion of a web page.

Referring now to FIG. 5, a block diagram illustrating an e-cart displayed in a portion of a web page is shown. In brief overview, a web page 500 comprises an e-cart 100. The e-cart comprises a checkout button 205. The web 500 also comprises a number of buttons 110*a*, 110*h* for a user to interact with the e-cart 100. A web page 500 may further comprises an additional display 505 of information related to the e-cart.

Still referring to FIG. 5, now in greater detail, an e-cart 100 is displayed in a portion of web page. The e-cart may be displayed using any technique for displaying a self-contained component in a web page, including without limitation applets, frames, <div> elements, or any previously discussed technique. For example, an e-cart may be incorporated in a web page using a <div> element using the following HTML code.

```
<div class="rightcart_div">
<script type="text/javascript">pid="70795885034956"</script>
<script type="text/javascript" src="http://www.rightcart.com/javascripts/rightcart_display.js">
</script>
</div>
```

In some HTML browsers, the above code will cause the browser to display a block as defined by the "righteart_div" class, which may, for example, specify a given alignment, height, width, or other properties for the block. The HTML code may also set a pid for the e-cart corresponding to the publisher of the web page in which the e-cart is displayed. In the example above, the pid specifed is 70795885034956. In other embodiments, a pid or other identifier may be used to identify a specific site on which the e-cart is located, a specific user of the e-cart, or any other information corresponding to a web page, product, layout, or configuration. In one embodiment, a pid may comprise an encrypted string comprising any of the information described. In the example above, the HTML code may also instruct a browser to download a javascript script from a server 105*b*. The script may comprise code for executing any of the e-cart functionality described herein.

In some embodiments, an e-cart 100 may occupy a fixed portion of a web page 500. In other embodiments, an e-cart may expand in size or contract in size. For example, in one embodiment an e-cart may comprise a button such that it can be minimized by a user. In another embodiment, an e-cart may expand to display detailed information about an item. In still another embodiment, an e-cart may expand or contract in size depending on the number of items in the e-cart.

In some embodiments, the HTML code for displaying an e-cart may be adapted such that it may be included in a number of web sites. For example, a publisher of a blog or technology review may wish to display an e-cart on their site. In one embodiment, the publisher may simply paste lines of HTML such as the lines above into their site such that an e-cart will be included in their site. The lines of HTML may be made available via a web site or transaction server 105*b* operated by the e-cart operator.

In the embodiment shown, the web page 500 comprises input means 110*a* for a user to add an item to the e-cart 100. The input means may comprises any input means which allow a user to interact with a web page, including without limitation, buttons, checkboxes, text fields, links, applets, and Flash applications. In the embodiment shown, if a user clicks on the 'add to cart' button 110*a* an item corresponding to 'product X' may be added to the e-cart. For example, an 'add to cart' button may be implemented with the following HTML code

```
<a href="http://www.rightcart.com/cart/add/413111?pid=70795885034956" target="rightcart">
<img src="http://www.rightcart.com/images/add_to_rightcart.gif" alt="Add to RightCart" width="139" height="24" border="0" /></a>
```

In the example above, the HTML code instructs a browser to download an image of a button from http://www.rightcart.com/images/add_to_rightcart.gif. When a user then clicks on the button, the browser is instructed to open the web page http://www.rightcart.com/cart/add/413111?pid=70795885034956 in the portion of the page labeled "rightcart." This allows the item to be added to an e-cart without the full web page 500 being reloaded. Instead, only the portion of the page corresponding to the e-cart will be reloaded. In the example above, a server 105*b* may be programmed to recognize a request for the given URL as a request to add a given item (#413111) to a particular e-cart. In some embodiments, the button may identify the item by means of a serial number, item number, UPC, or SKU number, item name, or other identifier. In one embodiment, the button may identify the item via an encrypted string. In one embodiment, the identity of the publisher or web site on which the e-cart is located may be determined by consulting the referrer header of an HTTP request.

A web page may also comprise a button 110*b* or other input means for a user to sign up for a service using an e-cart. For example, clicking on a button 110*b* may add an item to the e-cart 100 corresponding to a 1-year magazine subscription. Or, for example, clicking on a button 110*b* may sign up the e-cart user for a given manufacturer's mailing list. Or, for example, clicking on a button 110*b* may sign up the user to complete a given survey.

In some embodiments, the HTML code for displaying a button for interacting with an e-cart may be adapted such that it may be included in a number of web sites. For example, a publisher of a blog or technology review may wish to display an e-cart on their site. In one embodiment, the publisher may simply paste lines of HTML such as the lines above into their site such that an button for interacting with an e-cart will be included in their site. The lines of HTML may be made available via a web site or transaction server 105*b* operated by the e-cart operator. In one embodiment, a publisher may be able to specify an item for the button to add, and a web site operated by the e-cart operator may generate the HTML code required to display a button which has functionality for adding the specified item to an e-cart. For example, a web site publisher may wish to give visitors to the publisher's web site the ability to purchase a radio the web site reviews. The publisher may go to a website, enter the UPC code or SKU for the radio, and receive HTML code corresponding to an "add to cart" button which will add the radio to the e-cart of a visitor who clicks on the button. In other embodiments, the publisher may enter a name or description of an item to obtain HTML code corresponding to an "add to cart" button for the item. The publisher may also download code for displaying the e-cart on the publisher's web site as well.

In the embodiment shown, the web page 500 also comprises another component 505, labeled a "sideCart" which may display additional information relating to the e-cart or a particular transaction. In some embodiments, a sideCart may be contained within an e-cart or other transaction component. In other embodiments, a sideCart may comprise a separate component. A sideCart may comprise functionality for displaying any of the information discussed herein relating to an item or items, including without limitation reviews, images, advertising, specifications, related items, vendor ratings, store ratings, articles, and links. For example, if a web page 500 is a review of a particular model of stereo, the "add to cart" button 110a may add the particular model of stereo reviewed to the e-cart. The sideCart 505 may then display information corresponding to other models of stereos made by the same manufacturer. In another embodiment, a sideCart may provide functionality for a user to search a given web site or sites for a related product. The sideCart 505 may also comprise functionality for interacting with the e-cart 100, including input means for adding items to an e-cart. In some embodiments, a sideCart may be used to allow a user to add items to an e-cart on a web page which does not otherwise contain "add to cart" buttons or similar functionality.

In other embodiments, an e-cart or a sideCart or similar component may provide additional functionality. In one embodiment, an e-cart may provide functionality for a user to search for the cheapest item of a given type, brand, make, or model, or an item with a given quality of vendor rating, store rating, or review.

In one embodiment, an e-cart or sideCart may provide functionality for a user to send and receive messages within the e-cart. In one embodiment, an e-cart may provide functionality for a user to send and receive messages relating to a product in the user's e-cart. For example, an e-cart may notify a vendor or vendors upon the addition of an item to a user's e-cart. If an item has been in a user's e-cart for a given period of time, a chat function may allow a vendor to ask the user whether the user has any questions concerning the item, or recommend related items.

In another embodiment, an e-cart may be shared such that it is simultaneously accessible by a plurality of users at different locations. For example, two parents may wish to shop online for Hanukkah presents while both are at work in separate office buildings. An e-cart may allow two or more users to share an e-cart, such that when one user added an item to the e-cart, the e-cart would be updated such that the added item would appear in the e-carts of the other shared e-cart users.

In yet another embodiment, an e-cart may be limited to a given number of stores, or a given spending limit. For example, a parent may wish to limit a child's shopping online to a given number of kid-friendly stores, or a maximum dollar amount. In another embodiment, an e-cart may send a record of all purchases made or items added to a given person. In still another embodiment, an e-cart may send all purchases to a third party for prior approval. The e-cart may notify the third party by any means including without limitation email, SMS messaging, voice mail, publication to a web site, and cartCasting (as will be described herein).

In another embodiment, a single self-contained transaction component may comprise a plurality of e-carts. In one embodiment, the e-carts may be tabbed for easy access. For example, a user may have e-carts corresponding to Hanukkah shopping, birthday presents, and personal shopping. A component may allow the user to access all three e-carts for adding, removing and transferring items.

In still another embodiment, an e-cart or sideCart may allow a user to contact other e-cart users who have purchased or added a given item to their e-cart. In one embodiment, an e-cart may have a chat feature to enable such contact between users.

In another embodiment, an e-cart or sidecart may display statistics corresponding to a particular item's prevalence with respect to e-carts. For example, an e-cart may display how many other e-carts currently contain a given item, or the number of times a given item has been purchased using an e-cart. In some embodiments, this information may be displayed graphically, such as a chart displaying the sales activity of a particular product or products. In some embodiments, an e-cart or transaction server 105b may collect or aggregate information corresponding to e-cart transactions for statistical, reporting, or marketing purposes.

In another embodiment, an e-cart may allow a vendor to alter the price of items within a given e-cart. For example, if an item has remained in an e-cart for a given period of time, an e-cart may allow a vendor to specify a discount. Or for example, upon adding an item to an e-cart, the e-cart may display that a given special price is only available for a given amount of time. A vendor may, for example, offer a 10% discount if an item is purchased within ten minutes of it being added to an e-cart.

In yet another embodiment, an e-cart or sideCart may allow a user to publish the content of their e-cart. This process may be referred to as "cartCasting." In this embodiment, other e-cart users would then be able to view the content of the published e-cart. For example, a celebrity may publish the contents of his or her e-cart, so that other e-cart users could then see what particular items the celebrity is considering buying or has already purchased. In one embodiment, this publication may be by means of a web page which is periodically updated with the e-cart contents. In another embodiment, an e-cart may transmit an RSS feed corresponding to the cart contents. In some embodiments, an e-cart may provide functionality for viewing cartCasts as described above. In one embodiment, this feature may be implemented using the tabbed e-carts described above. For example, if a user signed up to observe a given celebrity's e-cart, the user may then be presented with a tabbed e-cart which will allow the user to view the contents of the celebrity's e-cart by selecting a given tab.

In one embodiment, an e-cart or plurality of e-carts may display items that are being watched, bid on, or purchased as part of a realtime or other auction network. In this embodiment, an e-cart may use any of the techniques described herein for the display and/or realtime updating of any auction statistics, including without limitation pricing, offers, and remaining time.

In some embodiments, an e-cart and any functionality described herein may be customized for a given user. For example, a user may be able to set preferences corresponding to the size, layout, and position of an e-cart. Or, for example, a user may be able to set preferences corresponding to any of the above functions, such as the appearance and number of tabbed e-carts. The e-cart or a transaction server 105b may store any such preferences. In other embodiments, an e-cart and any functionality described herein may be customized to a given publisher or web page.

In some embodiments, an e-cart or other self-contained transaction component may be displayed in an application environment. The self-contained transaction component may be implemented using any means capable of displaying a component in a given application, including without limitation HTML, javascript, applets, and scripts. The self-contained transaction component may also he incorporated into the application code itself. In one embodiment, an e-cart may be displayed in conjunction with a productivity application, such as a word processing application, or a spreadsheet editor. For example, a vendor may distribute a spreadsheet listing various products for sale. The spreadsheet may also comprise an e-cart as described herein.

Figure 6:
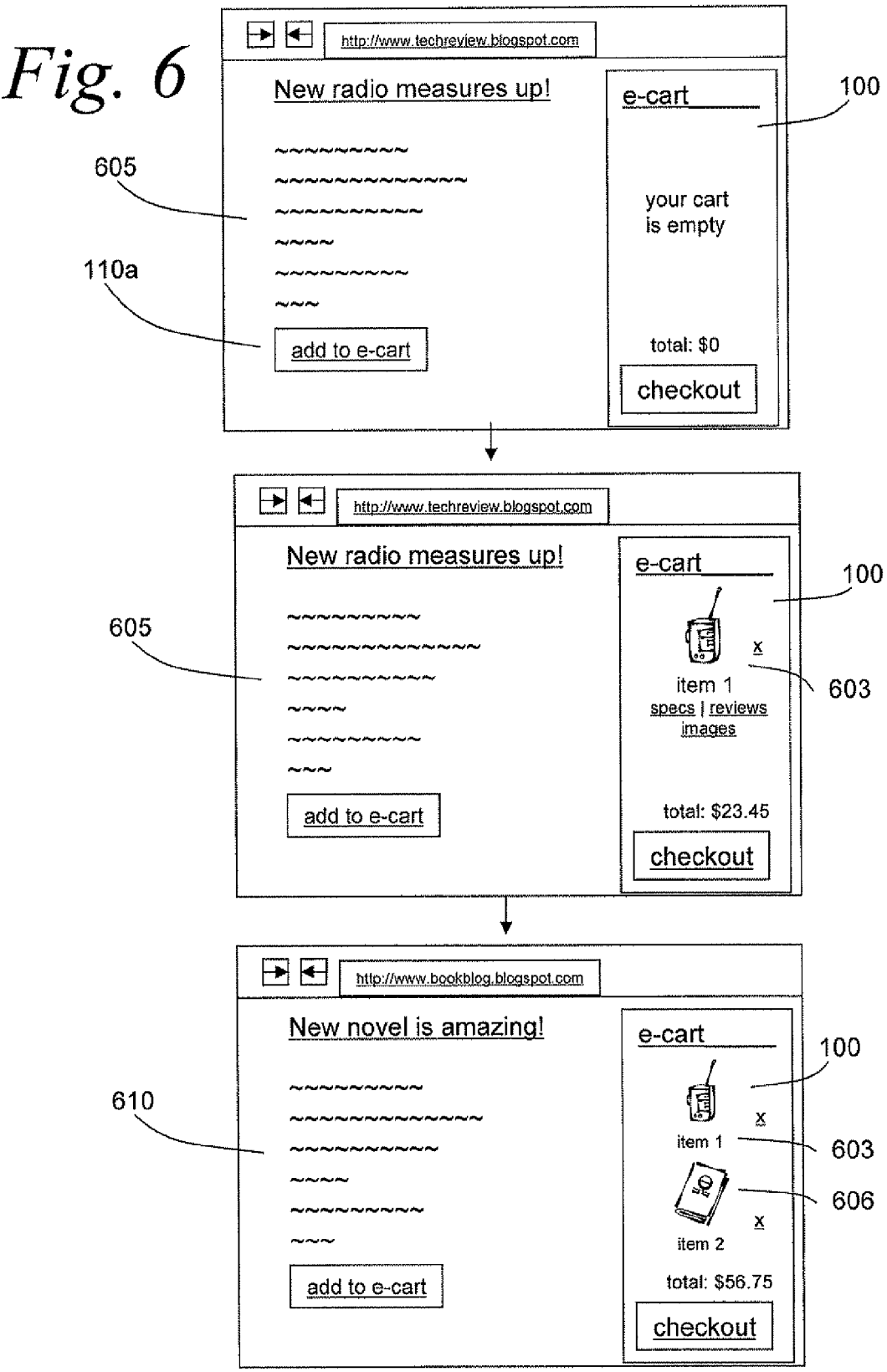
FIG. 6 depicts an example of an e-cart displayed on two unaffiliated web sites.

Referring now to FIG. 6, an example of an e-cart used on two unaffiliated web sites is shown. In brief overview, a web page 605 comprises an e-cart 100. A user may then add an item 603 to the e-cart. A user may then navigate to a second, unaffiliated web page 610, which also comprises an e-cart 100. The e-cart 100 displayed in the second web page may then comprise the previously added item 603. The e-cart 100 may be incorporated in the first and second web pages 605, 610 using any technique described herein.

Still referring to FIG. 6, now in greater detail, in the first screen shown, a web page 605 comprises an e-cart 100 and a button 110a which allows a user to add an item to the e-cart. After the user presses the button 110a, the second screen may be displayed, in which the e-cart 100 now comprises the added item 603.

The user may then navigate to a second web page 610, wherein the second web page 610 is unaffiliated with the first web page 605. An unaffiliated web page may comprise any page which is under the control of a different entity than a first page. For example, in the embodiment shown, the first and second web pages 605, 610 are blogs written by two different entities. Although both pages are hosted by blogspot, the pages are unaffiliated in that two different entities (the respective authors) are responsible for the content of the pages and/or the inclusion of the e-cart. When the user navigates to the second web page 610, the e-cart 100 displays the previously added item 603. The e-cart may then also allow a user to add an item 606 to the e-cart from the second web page 610. An e-cart may also display items previously added on sites hosted by different entities. In some embodiments, an e-cart 100 may receive a list of items currently in a user's e-cart from a server 105b. In other embodiments, an e-cart may comprise an application on a client 113 which stores items previously added by a user.

In some embodiments, a user may be able to access a single e-cart on a large number of unaffiliated pages. The e-cart may allow the user to add items from numerous sites, and purchase the items at a later time.

Figure 7:
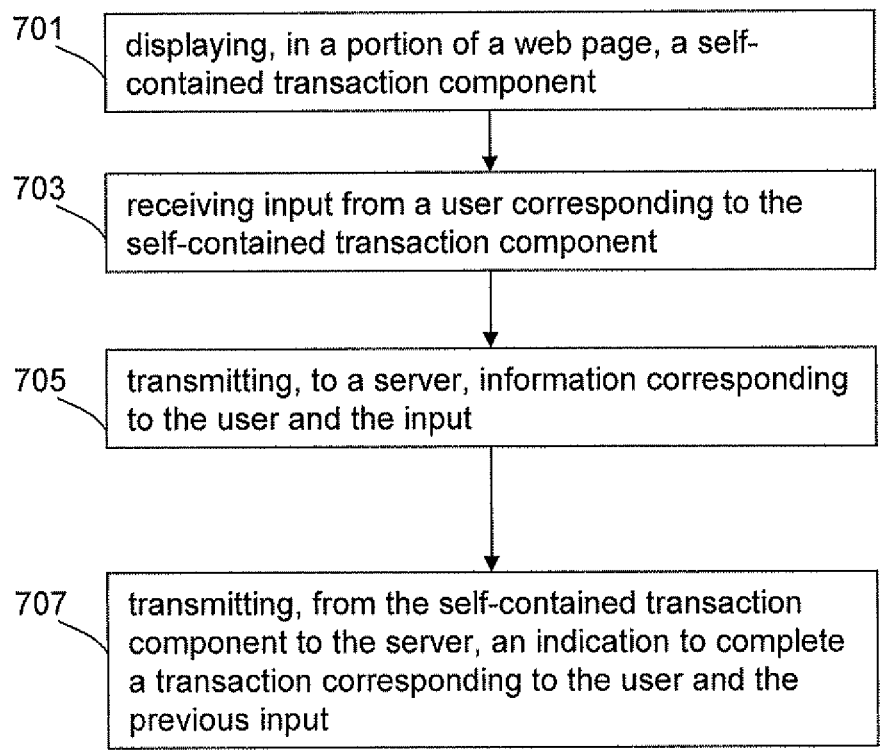
FIG. 7 is a block diagram of a method for facilitating third-party transactions on a web page using a self-contained transaction component.

Referring now to FIG. 7, a method for facilitating third-party transactions on a web page using a self-contained transaction component is shown. In brief overview, the method comprises: displaying, in a portion of a web page, a self-contained transaction component (step 701); receiving input from a user corresponding to the self-contained transaction component (step 703); transmitting, to a server, information corresponding to the user and the input (705); and transmitting, from the self-contained transaction component to the server, an indication to complete a transaction corresponding to the user and the previous input (707). The method will be described below in the context of being performed on a client 113, although the method may be performed on any computing device described herein.

Still referring to FIG. 7, now in greater detail, a client 113 may display, in a portion of a web page, a self-contained transaction component (step 701). The client may display the web page using any application capable of displaying a web page, such as a web browser such as Internet Explorer manufactured by Microsoft Corp., or Firefox published by the Mozilla Foundation.

A self-contained transaction component is a component which allows a user to complete a given transaction without requiring a user to leave the web page in which the transaction component is displayed. Examples of transactions that may be completed using a transaction component include purchasing items, signing up for services, and taking surveys. In some embodiments, a self-contained transaction component may comprise an e-cart as described herein. In some embodiments, a client 113 may first request a transaction component from a transaction server 105b. A client 113 may also receive from the transaction server 105b state information and previously entered user data for inclusion in the transaction component.

After displaying a self-contained transaction component, a client 113 may receive input from a user corresponding to the self-contained transaction component (step 703). The input from the user may comprise any interaction with a component described herein. In some embodiments, receiving input from a user via the self-contained transaction component (step 703) may comprise receiving an interaction with a component on the web page which in turn interacts with the self-contained transaction component. For example, a user may click on a button on the page which corresponds to adding an item to an e-cart, or signing up for a service, or indicating a desire to take on online survey. In these examples, the component on the web page which in turn interacts with the self-contained transaction component may be located outside of the self-contained transaction component. In some embodiments a self-contained transaction component may accept a plurality of inputs from a plurality of sources.

After receiving input from a user corresponding to the self-contained transaction component (step 703), a client may transmit, to a server, information corresponding to the user and the input (705). The transmission may comprise any information corresponding to the user as described herein, including without limitation usernames, user ids, cart ids, pids, cookie ids, computer ids, and browser ids. The transmission may comprise any information corresponding to the input as described herein, including without limitation information corresponding to items, surveys, billing information, shipping information, login information, and purchase information. The transmission may comprise any protocol or protocols described herein, and may be transmitted via any of the networks described herein. In one embodiment, the server may comprise a transaction server 105b. In some embodiments, input received by a self-contained transaction component may be aggregated for transmission to a server. In other embodiments, input received by a self-contained transaction component may be transmitted as soon as it is received. In some embodiments, the server may store said information for later access.

After transmitting information corresponding to the user and the input (step 705); the client 113 may transmit, from the self-contained transaction component to the server, an indication to complete a transaction corresponding to the user and the previous input (Step 707). The transmission may comprise any protocol or protocols described herein, and may be transmitted via any of the networks described herein. In one embodiment, the server may comprise a transaction server 105*b*. An indication to complete a transaction may comprise any indication that a user has confirmed a given transaction, and sufficient information has been entered to complete the transaction. In one embodiment, an indication to complete a transaction may comprise a user selecting "confirm" for a purchase for which the user has already input the items and billing information for the purchase. In another embodiment, an indication to complete a transaction may comprise a user selecting "submit" in relation to information entered as part of an online survey.

In some embodiments, the server receiving the transmission may then transmit information to a third party in order to execute the indicated transaction. For example, the server may transmit the results of a survey to a third party. Or for example, the server may transmit information corresponding to a purchase to a vendor or service provider for fulfillment.

Figure 8:
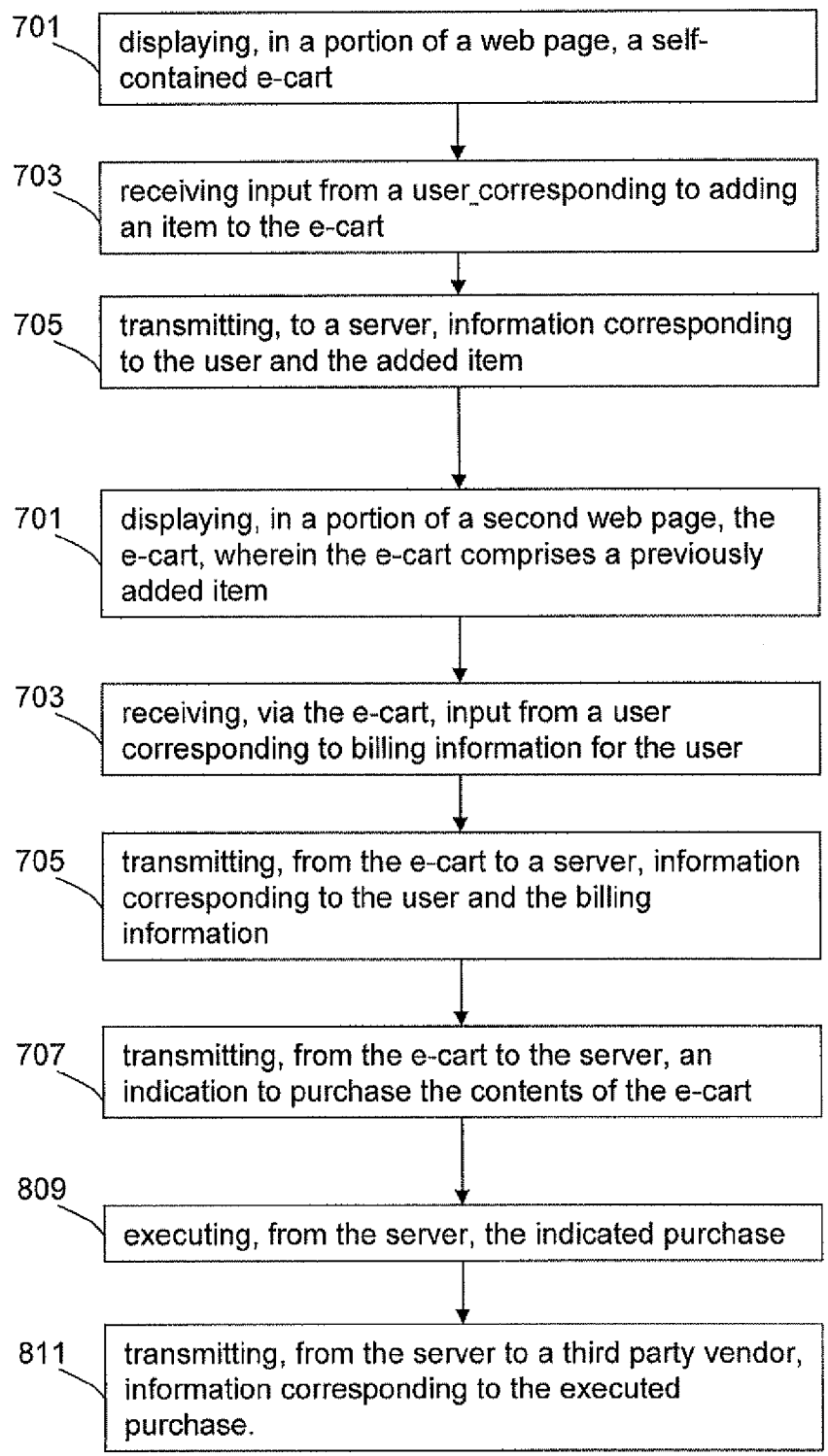
FIG. 8 is a block diagram of a method for facilitating third-party transactions on a web page using an e-cart.

Referring now to FIG. 8, a method for facilitating third-party transactions on a web page using an e-cart is shown. In brief overview, the method comprises: displaying, in a portion of a web page, a self-contained transaction component, wherein the self-contained transaction component comprises an e-cart (step 701); receiving input from a user corresponding to adding an item to the e-cart (step 703); transmitting, to a server, information corresponding to an item added to the e-cart (step 705); displaying, in a portion of a second web page, the e-cart, wherein the e-cart comprises a previously added item (step 701); receiving, via the e-cart, input from a user corresponding to billing information for the user (step 703); transmitting, from the e-cart to a server, information corresponding to the user and the billing information (step 705); transmitting, from the e-cart to the server, an indication to purchase the contents of the e-cart (step 707); executing, from the server, the indicated purchase (step 809); transmitting, from the server to a third party vendor, information corresponding to the executed purchase for fulfillment (step 811) Steps 701-707 will be described below in the context of being performed on a client 113, although the method may be performed on any computing device described herein.

Still referring to FIG. 8, now in greater detail, a client 113 may display, in a portion of a web page, a self-contained transaction component, wherein the self-contained transaction component comprises an e-cart (step 701). The client 113 may display the web page and e-cart in any manner described herein. The e-cart may comprise any functionality described herein.

After displaying, in a portion of a web page, an e-cart (step 701); the client 113 may receive input from a user corresponding to adding an item to the e-cart (step 203). This step may be performed according to any embodiment described herein. In some embodiments, the client 113 may receive input corresponding to any other e-cart function described herein, including without limitation sorting items, removing items, requests for information corresponding to items, chat functions, requests to view alternative products, billing information, address information, personal information, and search functions.

After receiving input from a user corresponding to adding an item to the e-cart (step 703); the client 213 may transmit, to a server, information corresponding to an item added to the e-cart (step 705). This step may be performed in accordance with any embodiment discussed herein. In some embodiments, the client 213 may transmit, from the e-cart to a server, information corresponding to any other input received via the e-cart.

After transmitting, to a server, information corresponding to an item added to the e-cart (step 705); the client may display, in a portion of a second web page, the e-cart, wherein the e-cart comprises a previously added item (step 701). This step may be performed in accordance with any of the embodiments discussed herein. In some embodiments, the second web page may be unaffiliated with the first web page. In some embodiments, an e-cart corresponding to a specific user may be displayed on any number of unaffiliated web pages. In some embodiments, the e-cart may comprise other information corresponding to previous input from a user in accordance with any of the e-cart functions described herein.

After displaying, in a portion of a second web page, the e-cart, wherein the e-cart comprises a previously added item (step 701), a client may receive, via the e-cart, input from a user corresponding to billing information for the user (step 703). This step may be performed in accordance with any of the embodiments described herein. In some embodiments, the e-cart may receive any other input corresponding to the e-cart functions described herein.

After transmitting, to a server, information corresponding to the user and the billing information (step 705) a client may transmit, from the e-cart to the server, an indication to purchase the contents of the e-cart (step 707). This step may be performed in accordance with any of the embodiments discussed herein.

After transmitting, from the e-cart to the server, an indication to purchase the contents of the e-cart (step 707); the method may comprise executing, from the server, the indicated purchase (step 809). Executing the indicated purchase may comprise any method of securing payment for the items to be purchased. In some embodiments, executing the indicated purchase may comprise placing a charge on a credit card or debit card of the user. In other embodiments, executing the indicated purchase may comprise performing an electronic withdrawal from an account held by the purchaser. In some embodiments, the purchase may be executed electronically, such as by communicating with a payment processing server 105*c*.

After executing, from the server, the indicated purchase (step 809); the method may comprise transmitting, from the server to a third party vendor, information corresponding to the executed purchase (step 811). This step may be performed in accordance with any of the embodiments described herein. In one embodiment, the server transmits the information corresponding to the executed purchase to the vendor for fulfillment purposes, such that the shipping of the purchased items will be handled by the vendor. In some embodiments, the server may transmit any information corresponding to the purchase, including item names, quantity, product identifiers, UPC codes, SKU numbers, special instructions, and shipping information. In some embodiments, the server may also transmit funds corresponding to a purchase price for the given items. In one embodiment the server may transmit funds at a later date, such as upon shipping of a product, receipt of a product by a user, or completion of a given trial period. In one embodiment, the server may collect funds from a payment processing server and then hold the funds in escrow until a later date. In another embodiment, the server may reserve or obtain temporary approval for a funds transfer upon completion of a purchase, and complete the actual funds transfer at a later date.

In some embodiments, the methods and systems described above may be used for generating revenue from sales conducted through the e-carts. In one embodiment, the operator of the transaction server 105*b*, may collect a fee along with each purchase or transaction using an e-cart. In some embodiments, this fee may be a fixed dollar amount, in other embodiments, the fee may be a percentage of the value of items purchased. In one embodiment, a transaction server 105*b* may deduct the fee from the funds transferred to the vendor. In another embodiment, the fee may be added to the purchase price displayed to the user of an e-cart. In still other embodiments, the amount of the fee may be negotiated with individual vendors. In some embodiments, a portion of the collected fee may be passed to the publisher of the site on which the sale originated. In other embodiments, a portion of the collected fee may be passed to the publisher of the site on which the sale is completed.

For example, a publisher technology review site may publish a review of a new mp3 player. The publisher may agree to include on the web page of the review an e-cart and a button for adding the new mp3 player to the e-cart in exchange for 1% of the sales revenue generated from the e-cart on the site. The vendor of the mp3 player may also agree to have their product included in the e-cart system in exchange for allowing the transaction server operator to keep 3% of the purchase price of any mp3 players sold through the e-cart system. If a user then buys an mp3 player through the e-cart on the technology review site's page for $100, the transaction server may charge the user's credit card for $100, and then transfer $1 to the publisher, and $97 to the vendor, while keeping the remaining $2.

In some embodiments, the methods and systems described above may be used for generating revenue from advertising utilizing the e-carts or other self-contained transaction units. For example, a vendor may pay a fee to have a product displayed in the "related products" section of a sidecart, as discussed above. Or for example, a vendor may pay a fee to provide in depth information about a given product when it is added to an e-cart. In some embodiments, a vendor may pay to have a given product or products featured in an e-cart. For example, a vendor may pay to have a given model of stereo featured in all e-carts displayed on electronics web sites.

In some embodiments, the methods and systems described above may be combined with web page analysis and page rewriting technology. In one embodiment, a publisher may use web page analysis and rewriting tools to dynamically or automatically add to a given web page e-carts and 'add' buttons featuring items related to the page. In some embodiments, web page analysis tools, such as DOM analysis, may be used to highlight items on a web page which may be purchased through an e-cart. The publisher may then receive a percentage of each sale generated by the e-carts on the publisher's web pages.

The list of available products for purchase using an e-cart may be compiled in any manner. In some embodiments, vendors may add products which may be purchased using an e-cart system by completing an online form or other standardized submission. In another embodiment, an e-cart system may be linked with a retailer, such as Amazon.com, and offer for sale items which are sold through the retailer. In yet another embodiment, the list of available products may be provided by vendors through a cartcast.

While the invention has been particularly shown and described with reference to specific preferred embodiments, it should be understood by those skilled in the art that various changes in form and detail may be made therein departing from the spirit and scope of the invention as defined by the appended claims.

We claim:

1. A method comprising:
creating, in a web page of a first publisher, a listing of a first item, the web page of the first publisher including a self-contained transaction component;
adding the first item to the self-contained transaction component in response to a selection of the first item from the listing of the first item by a user;
creating, in a web page of a second publisher, a listing of a second item, the webpage of the second publisher including the self-contained transaction component having the first item displayed therein, wherein the second web page is unaffiliated with the first web page;
adding the second item to the self-contained transaction component in response to a selection of the second item from the listing of the second item by the user;
performing, by the self-contained transaction component operating on a computing device, from entirely within the self-contained transaction component without leaving the web page of the second publisher:
determining an account of the user, wherein the determination includes at least one of authenticating the user using an existing account and creating a new account for the user;
determining billing information for the user, wherein the determination includes at least one of using previously used billing information for the user and receiving new billing information for the user; and
completing a purchase of the first item and the second item.

2. The method of claim 1, further comprising:
displaying, in a portion of the web page of the first publisher, the self-contained transaction component, the self-contained transaction component comprising an e-cart.

3. The method of claim 2, further comprising:
displaying, in a portion of the web page of the second publisher, the e-cart, wherein the e-cart comprises the first item.

4. The method of claim 1, further comprising:
receiving, via the self-contained transaction component, an indication to remove one of the first item and the second item from the self-contained transaction component.

5. The method of claim 4, further comprising:
responsive to the indication, removing the one of the first item and the second item from the self-contained transaction component.

6. The method of claim 1, further comprising:
receiving, via the self-contained transaction component, shipping information for at least one of the first item and the second item, the shipping information associated with the user.

7. The method of claim 1, further comprising:
receiving, via the self-contained transaction component, authenticating information of the user.

8. The method of claim 1, further comprising:
receiving, via the self-contained transaction component, an indication to store the first item and the second item added to the self-contained transaction component; and
transmitting, to a server, an indication to store the first item and the second item in a database of the server.

9. The method of claim 1, further comprising:
transmitting, to a server of a vendor of the first item, information corresponding to the first item of the completed purchase; and transmitting, to a server of a vendor of the second item, information corresponding to the second item of the completed purchase.

10. The method of claim 9, further comprising:
executing, by the server of the vendor of the first item, a first portion of the completed purchase corresponding to the first item; and
executing, by the server of the vendor of the second item, a second portion of the completed purchase corresponding to the second item.

11. A system comprising:
one or more computer processors having memory with executable instructions which configure the one or more computer processors to:
create, in a web page of a first publisher, a listing of a first item, the web page of the first publisher including a self-contained transaction component;
add the first item to the self-contained transaction component in response to a selection of the first item from the listing of the first item by a user;
create, in a web page of a second publisher, a listing of a second item, the webpage of the second publisher including the self-contained transaction component having the first item displayed therein, wherein the second web page is unaffiliated with the first web page;
add the second item to the self-contained transaction component in response to a selection of the second item from the listing of the second item by the user;
perform, by the self-contained transaction component, from entirely within the self-contained transaction component without leaving the web page of the second publisher:
determine an account of the user, wherein the determination includes at least one of authenticating the user using an existing account and creating a new account for the user;
determine billing information for the user, wherein the determination includes at least one of using previously used billing information for the user and receiving new billing information for the user; and
complete a purchase of the first item and the second item.

12. The system of claim 11, wherein the executable instructions further comprise instructions to:
display, in a portion of the first web page of the first publisher, the self-contained transaction component, the self-contained transaction component comprising an e-cart.

13. The system of claim 12, wherein the executable instructions further comprise instructions to:
display, in a portion of the web page of the second publisher, the e-cart, wherein the e-cart comprises the first item.

14. The system of claim 11, wherein the executable instructions further comprise instructions to:
receive, via the self-contained transaction component, an indication to remove one of the first item and the second item from the self-contained transaction component.

15. The system of claim 14, wherein the executable instructions further comprise instructions to:
remove, responsive to the indication, the one of the first item and the second item from the self-contained transaction component.

16. The system of claim 11, wherein the executable instructions further comprise instructions to:
receive, via the self-contained transaction component, shipping information for at least one of the first item and the second item, the shipping information associated with the user.

17. The system of claim 11, wherein the executable instructions further comprise instructions to:
receive, via the self-contained transaction component, authenticating information of the user.

18. The system of claim 11, wherein the executable instructions further comprise instructions to:
receive, via the self-contained transaction component, an indication to store the first item and the second item added to the self-contained transaction component; and
transmit, to a server, an indication to store the first item and the second item in a database of the server.

19. The system of claim 11, wherein the executable instructions further comprise instructions to:
transmit, to a server of a vendor of the first item, information corresponding to the first item of the completed purchase; and
transmit, to a server of a vendor of the second item, information corresponding to the second item of the completed purchase.

20. The system of claim 19, wherein the executable instructions further comprise instructions to:
indicate, to the server of the vendor of the first item, to execute a first portion of the completed purchase corresponding to the first item; and
indicate, to the server of the vendor of the second item, to execute a second portion of the completed purchase corresponding to the second item.

* * * * *